US012371014B2

(12) United States Patent
Aizawa et al.

(10) Patent No.: US 12,371,014 B2
(45) Date of Patent: Jul. 29, 2025

(54) MOBILE OBJECT CONTROL DEVICE, MOBILE OBJECT CONTROL METHOD, AND STORAGE MEDIUM

(71) Applicant: HONDA MOTOR CO., LTD., Tokyo (JP)

(72) Inventors: Koki Aizawa, Wako (JP); Kosuke Nakanishi, Wako (JP); Takashi Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 18/070,628

(22) Filed: Nov. 29, 2022

(65) Prior Publication Data
US 2023/0174061 A1    Jun. 8, 2023

(30) Foreign Application Priority Data
Dec. 7, 2021  (JP) ................. 2021-198522

(51) Int. Cl.
*B60W 30/10* (2006.01)
*B60W 10/20* (2006.01)
(Continued)

(52) U.S. Cl.
CPC ............ *B60W 30/12* (2013.01); *B60W 10/20* (2013.01); *B60W 30/143* (2013.01);
(Continued)

(58) Field of Classification Search
CPC ........ G06V 20/58; G06V 20/588; G06T 7/73; G06T 7/10; G06T 2207/30256;
(Continued)

(56) References Cited

U.S. PATENT DOCUMENTS

2003/0016287 A1* 1/2003 Nakayama ............... G06T 7/12
  348/148
2008/0273750 A1* 11/2008 Fujimoto ............... G06V 40/10
  348/148
(Continued)

FOREIGN PATENT DOCUMENTS

JP     2005-182407        7/2005
JP     2005182407 A  *    7/2005
(Continued)

OTHER PUBLICATIONS

Japanese Office Action for Japanese Patent Application No. 2021-198522 mailed Nov. 5, 2024.
(Continued)

*Primary Examiner* — Stephen Holwerda
(74) *Attorney, Agent, or Firm* — Amin, Turocy & Watson, LLP

(57) ABSTRACT

A mobile object control device of an embodiment includes a partition line candidate recognizer that recognizes candidates for partition lines for partitioning a traveling lane in which a mobile object travels from a first image including the vicinity of the mobile object captured by an image capturer, and a partition line searcher that selects a partition line candidate closest to a past partition line for partitioning the traveling lane of the mobile object before a predetermined time, among the partition line candidates recognized by the partition line candidate recognizer, as a partition line for partitioning a current traveling lane of the mobile object.

10 Claims, 7 Drawing Sheets

(51) Int. Cl.
  *B60W 30/12* (2020.01)
  *B60W 30/14* (2006.01)
  *B60W 40/06* (2012.01)
  *G06F 17/17* (2006.01)
  *G06V 20/56* (2022.01)
  *G06V 20/58* (2022.01)

(52) U.S. Cl.
  CPC ............ *B60W 40/06* (2013.01); *G06F 17/17* (2013.01); *G06V 20/588* (2022.01); *B60W 2420/403* (2013.01); *B60W 2552/53* (2020.02); *B60W 2556/10* (2020.02)

(58) Field of Classification Search
  CPC .... B60W 30/12; B60W 30/143; B60W 40/06; B60W 10/20; B60W 2552/53; B60W 2556/10; B60W 2420/403; G06F 17/17
  See application file for complete search history.

(56) References Cited

U.S. PATENT DOCUMENTS

| | | | |
|---|---|---|---|
| 2009/0167864 A1 | 7/2009 | Unoura | |
| 2014/0098196 A1* | 4/2014 | Guan | H04N 13/239 |
| | | | 348/148 |
| 2015/0375784 A1 | 12/2015 | Ogawa | |
| 2016/0012300 A1* | 1/2016 | Tsuruta | G06F 18/22 |
| | | | 382/104 |
| 2016/0137202 A1 | 5/2016 | Kawasaki et al. | |
| 2016/0314360 A1 | 10/2016 | Kizumi | |
| 2016/0350603 A1* | 12/2016 | Suddamalla | G06T 7/13 |
| 2018/0204073 A1* | 7/2018 | Kawano | B60W 30/12 |
| 2019/0156128 A1* | 5/2019 | Zhang | G06V 20/588 |

FOREIGN PATENT DOCUMENTS

| | | | | |
|---|---|---|---|---|
| JP | 2005-265494 | | 9/2005 | |
| JP | 2005265494 A | * | 9/2005 | |
| JP | 2014-160322 | | 9/2014 | |
| JP | 2014160322 A | * | 9/2014 | ............ B60Q 9/00 |
| JP | 2016-099719 | | 5/2016 | |
| JP | 2016099719 A | * | 5/2016 | |
| JP | 2016-203814 | | 12/2016 | |
| JP | 2018-055414 | | 4/2018 | |
| WO | 2007/077682 | | 7/2007 | |

OTHER PUBLICATIONS

Japanese Notice of Allowance for Japanese Patent Application No. 2021-198522 mailed Jun. 17, 2025.

* cited by examiner

MOBILE OBJECT CONTROL DEVICE, MOBILE OBJECT CONTROL METHOD, AND STORAGE MEDIUM

CROSS-REFERENCE TO RELATED APPLICATION

Priority is claimed on Japanese Patent Application No. 2021-198522, filed Dec. 7, 2021, the content of which is incorporated herein by reference.

BACKGROUND

Field of the Invention

The present invention relates to a mobile object control device, a mobile object control method, and a storage medium.

Description of Related Art

In recent years, there has been progress in research for automated driving for automatically controlling the traveling of a vehicle. In connection with this, a technique of adjusting a layout of lanes on the basis of lanes around a vehicle detected by a sensor that detects the surrounding situation of the vehicle and lanes around the vehicle acquired from map data on the basis of the position and posture of the vehicle is known (for example, Japanese Unexamined Patent Application, First Publication No. 2018-55414).

SUMMARY

However, in a case where lane partition lines on existing roads are lost or interrupted due to the instability of recognition performed by a sensor that detects the surrounding situation of a mobile object such as a vehicle, there is a possibility of more partition lines than the actual number of partition lines being recognized. For this reason, there have been cases where it is not possible to accurately recognize partition lines for partitioning a lane in which a host vehicle travels.

The present invention was contrived in view of such circumstances, and one object thereof is to provide a mobile object control device, a mobile object control method, and a storage medium that make it possible to more accurately recognize partition lines for partitioning a traveling lane.

The following configurations are adopted in a mobile object control device, a mobile object control method, and a storage medium according to this invention.

(1) According to an aspect of this invention, there is provided a mobile object control device including: a partition line candidate recognizer that recognizes candidates for partition lines for partitioning a traveling lane in which a mobile object travels from a first image including the vicinity of the mobile object captured by an image capturer; and a partition line searcher that selects a partition line candidate closest to a past partition line for partitioning the traveling lane of the mobile object before a predetermined time, among the partition line candidates recognized by the partition line candidate recognizer, as a partition line for partitioning a current traveling lane of the mobile object.

(2) In the aspect of the above (1), the past partition line is extracted from a second image including the vicinity of the mobile object captured by the image capturer before the predetermined time.

(3) In the aspect of the above (1), the partition line searcher detects closeness between the partition line candidate and the past partition line in a section obtained by partially cutting out the partition line candidates recognized by the partition line candidate recognizer and the past partition line on the basis of a reference position.

(4) In the aspect of the above (1), in a case where each of the partition line candidates recognized by the partition line candidate recognizer and the past partition line are compared with each other, the partition line searcher determines a partition line closest to the past partition line on the basis of a distance from a search starting point determined in advance to a predetermined number of points on the past partition line to the partition line candidate.

(5) In the aspect of the above (4), the partition line searcher converts the first image and a second image including the vicinity of the mobile object captured by the image capturer before the predetermined time into an image of the mobile object viewed from above, and determines a partition line closest to the past partition line on the basis of a square mean value of a difference in lateral position between each of the partition line candidates included in the converted image and the past partition line.

(6) In the aspect of the above (4), the search starting point is set on the basis of parameter information of the image capturer.

(7) In the aspect of the above (1), the partition line searcher corrects a position of the past partition line on the basis of one or both of a movement amount and movement direction of the mobile object before the predetermined time or a shape of a road.

(8) In the aspect of the above (1), in a case where closeness of a partition line candidate closest to the past partition line for partitioning the traveling lane of the mobile object before a predetermined time among the partition line candidates recognized by the partition line candidate recognizer is equal to or greater than a threshold, the partition line searcher selects partition lines for partitioning a past traveling lane of the mobile object searched in the past as partition lines of the current traveling lane.

(9) In the aspect of the above (1), the mobile object control device further includes a driving controller that controls one or both of a speed or steering of the mobile object so that the mobile object travels along the partition lines for partitioning the traveling lane of the mobile object determined by the partition line searcher.

(10) According to an aspect of this invention, there is provided a mobile object control method including causing a computer of a mobile object control device to: recognize candidates for partition lines for partitioning a traveling lane in which a mobile object travels from a first image including the vicinity of the mobile object captured by an image capturer; and select a partition line candidate closest to a past partition line for partitioning the traveling lane of the mobile object before a predetermined time, among the recognized partition line candidates, as a partition line for partitioning a current traveling lane of the mobile object.

(11) According to an aspect of this invention, there is provided a computer readable non-transitory storage medium having a program stored therein, the program causing a computer of a mobile object control device to: recognize candidates for partition lines for partitioning a traveling lane in which a mobile object travels from a first image including the vicinity of the mobile object captured by an image capturer; and select a partition line candidate closest to a past partition line for partitioning the traveling lane of the mobile object before a predetermined time, among the recognized partition line candidates, as a partition line for partitioning a current traveling lane of the mobile object.

According to the aspects of the above (1) to (11), it is possible to more accurately recognize partition lines for partitioning a host vehicle lane.

DESCRIPTION OF EMBODIMENTS

Hereinafter, an embodiment of a mobile object control device, a mobile object control method, and a storage medium of the present invention will be described with reference to the accompanying drawings. The mobile object control device is a device that controls the movement of a mobile object. Examples of the mobile object includes a three-wheeled or four-wheeled vehicle, a two-wheeled vehicle, a micro mobility, and the like, and may include, for example, any mobile object on which a person (an occupant) is on board and which can move on a road surface or the like having a traveling lane. In the following description, the mobile object is assumed to be a four-wheeled vehicle and is referred to as a "host vehicle M." Hereinafter, the host vehicle M is mainly assumed to be an automated driving vehicle. The term "automated driving" refers to, for example, executing driving control for automatically controlling one or both of the steering or speed of the host vehicle M. Examples of driving control of the host vehicle M include a lane keeping assistance system (LKAS) which is driving assistance control for the host vehicle M to travel in a host lane (traveling lane) in which the host vehicle M travels without deviating from the host lane. Examples of driving control may include various types of driving assistance control such as auto lane changing (ALC) or adaptive cruise control (ACC). Driving of the automated driving vehicle may be controlled by manual driving of an occupant (a driver). Alternatively, the driving source of the host vehicle M is, for example, an internal-combustion engine such as a diesel engine or a gasoline engine, an electric motor, or a combination thereof. The electric motor operates using power generated by a generator connected to an internal-combustion engine or discharging power of a secondary battery or a fuel cell.

[Overall Configuration]

Figure 1:
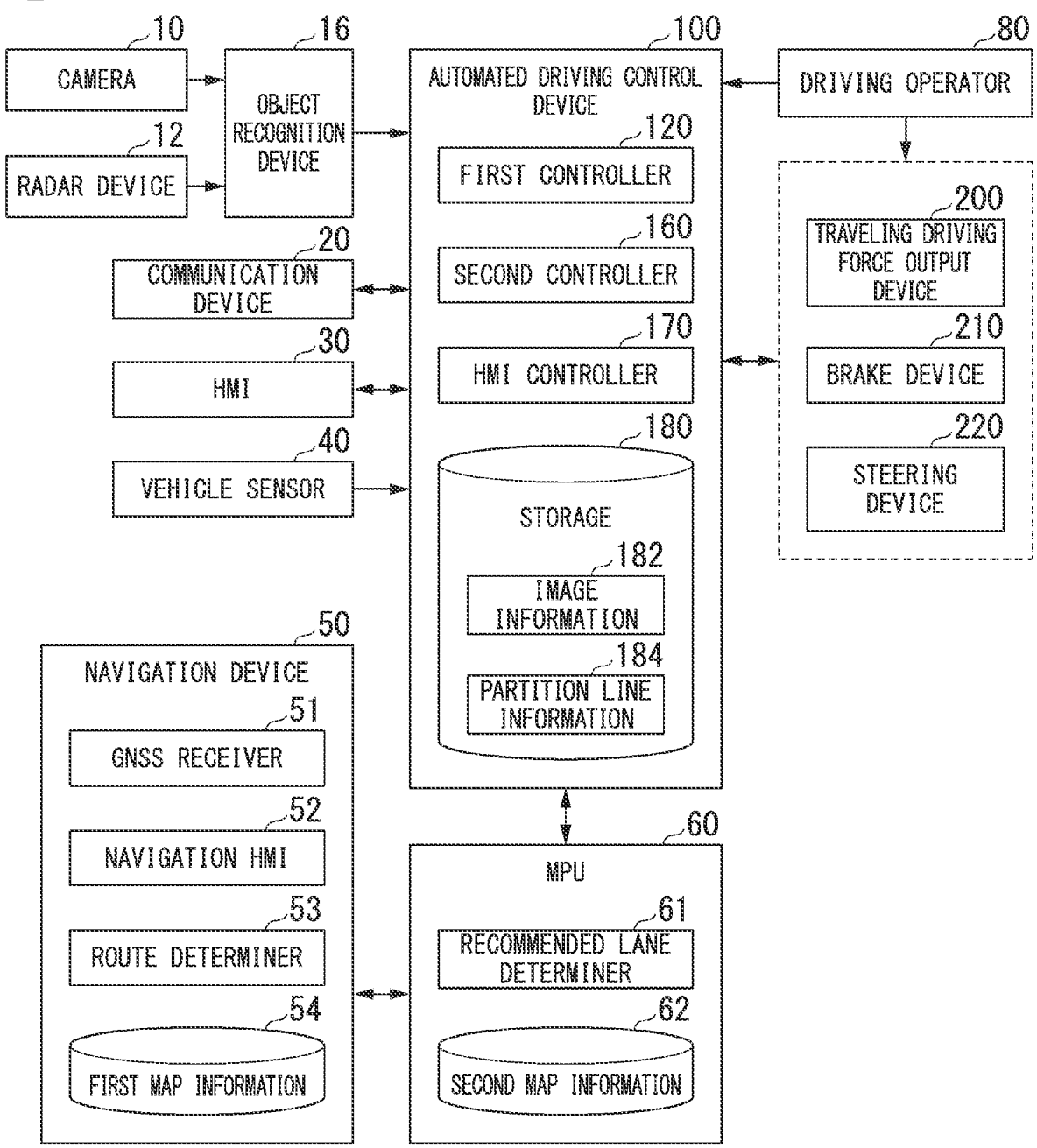
FIG. 1 is a configuration diagram of a vehicle system using a mobile object control device according to an embodiment.

FIG. 1 is a configuration diagram of a vehicle system 1 using a mobile object control device according to an embodiment. The vehicle system 1 includes, for example, a camera 10, a radar device 12, an object recognition device 16, a communication device 20, a human machine interface (HMI) 30, a vehicle sensor 40, a navigation device 50, a map positioning unit (MPU) 60, a driving operator 80, an automated driving control device 100, a traveling driving force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 1 is merely an example, and some portions of the configuration may be omitted, or other configurations may be further added. The camera 10 is an example of an "image capturer." The automated driving control device 100 is an example of a "mobile object control device."

The camera 10 is a digital camera using a solid-state imaging element such as, for example, a charge coupled device (CCD) or a complementary metal oxide semiconductor (CMOS). The camera 10 is installed at any point on the host vehicle M having the vehicle system 1 mounted therein. In a case where a forward image is captured, the camera 10 is installed on the upper portion of the front windshield, the rear surface of the rear-view mirror, or the like. The camera 10, for example, repeatedly captures an image of the vicinity of the host vehicle M periodically. The camera 10 may be a stereo camera.

The radar device 12 radiates radio waves such as millimeter waves to the vicinity of the host vehicle M, and detects radio waves (reflected waves) reflected from an object to detect at least the position (distance to and orientation of) of the object. The radar device 12 is installed at any point on the host vehicle M. The radar device 12 may detect the position and speed of an object with a frequency modulated continuous wave (FM-CW) system.

The object recognition device 16 analyzes an image indicating a situation ahead of the host vehicle M captured by the camera 10 and extracts necessary information. The object recognition device 16 then performs a sensor fusion process on the detection results of the camera 10 and the radar device 12 to recognize the position, type, speed, or the like of an object, and outputs the recognition result to the automated driving control device 100. In the present invention, the radar device 12 may be omitted, in which case the object recognition device 16 may have a function of analyzing an image. The detection result of the radar device 12 may be output to the automated driving control device 100 as it is without performing the sensor fusion process. The function of the object recognition device 16 may be included in the automated driving control device 100 (more specifically, a recognizer 130 to be described later). In this case, the object recognition device 16 may be omitted from the vehicle system 1.

The communication device 20 communicates another vehicle which is present in the vicinity of the host vehicle M using, for example, a cellular network, a Wi-Fi network, Bluetooth (registered trademark), dedicated short range communication (DSRC), or the like, or communicates with various types of server devices through a wireless base station.

The HMI 30 outputs various types of information to an occupant of the host vehicle M under the control of HMI controller 170. The HMI 30 may function as an accepter that accepts an input operation performed by the occupant. The HMI 30 is provided with, for example, a display device, a speaker, a microphone, a buzzer, a key, an indicator lamp, and the like. The display device is, for example, a liquid crystal display (LCD), an organic electro luminescence (EL) display device, or the like.

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like. The vehicle sensor 40 may be provided with a position sensor that acquires the position of the host vehicle M. The position sensor is, for example, a sensor that acquires position information (longitude and latitude information) from a Global Positioning System (GPS) device. The position sensor may be a sensor that acquires position information using a global navigation satellite system (GNSS) receiver 51 of the navigation device 50.

The navigation device 50 includes, for example, the GNSS receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M on the basis of a signal received from a GNSS satellite. The position of the host vehicle M may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described HMI 30. The route determiner 53 determines, for example, a route (hereinafter, a route on a map) from the position (or any input position) of the host vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server using the communication device 20, and acquire the same route as the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides the route on a map every 100 [m] in a vehicle traveling direction), and determines a recommended lane for each block with reference to the second map information 62. For example, in a case where the lane in which a vehicle is currently traveling or the road on which the vehicle will travel in the near future is multi-lane, the recommended lane determiner 61 makes a determination on which lane from the left to travel along. In a case where a branch point is present in the route on a map, the recommended lane determiner 61 determines a recommended lane so that the host vehicle M can travel along a logical route for advancing to a branch destination.

The second map information 62 is map information having a higher accuracy than the first map information 54. The second map information 62 includes, for example, information on the center of a lane, information on the boundary of a lane (for example, a road partition line), or the like. The second map information 62 may include road information (road type), the number of lanes of a road, branching, the presence or absence of merging, legal speed (speed limit, maximum speed, or minimum speed), traffic regulation information, address information (an address or a postal code), facility information, telephone number information, or the like. The second map information 62 may be updated when necessary by the communication device 20 communicating with another device.

The driving operator 80 includes, for example, a steering wheel, an accelerator pedal, a brake pedal, a shift lever, and other operators. A sensor that detects the amount of operation or the presence or absence of operation is installed on the driving operator 80, and the detection results are output to the automated driving control device 100, or some or all of the traveling driving force output device 200, the brake device 210, and the steering device 220.

Next, the traveling driving force output device 200, the brake device 210, and the steering device 220 will be described in advance of description of the automated driving control device 100. The traveling driving force output device 200 outputs traveling driving force (torque) for the host vehicle M to travel to the driving wheels. The traveling driving force output device 200 includes, for example, a combination of an internal-combustion engine, an electric motor, a transmission, or the like, and an electronic control unit (ECU) that controls these components. The ECU controls the above components in accordance with information which is input from the automated driving control device 100 (specifically, a second controller 160 to be described later) or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which input from the second controller 160 or the information which input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from a steering wheel 82 of the driving operator 80, and changes the direction of the turning wheel.

Next, the automated driving control device 100 will be described. The automated driving control device 100 includes, for example, a first controller 120, the second controller 160, an HMI controller 170, and a storage 180. The first controller 120, the second controller 160, and the HMI controller 170 are realized by a hardware processor such as, for example, a central processing unit (CPU) executing a program (software). Some or all of these components may be realized by hardware (a circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device such as the HDD or the flash memory (a storage device including a non-transitory storage medium) of the automated driving control device 100 in advance, may be stored in a detachable storage medium such as a DVD or a CD-ROM, or may be installed in the HDD or the flash memory of the automated driving control device 100 by the storage medium (the non-transitory storage medium) being mounted in a drive device. A combination of a behavior plan generator 140 and the second controller 160 are an example of a "driving controller."

The storage 180 may be realized by various storage devices described above, a solid state drive (SSD), an electrically erasable programmable read only memory (EEPROM), a read only memory (ROM), a random access memory (RAM), or the like. The storage 180 stores, for example, image information 182, partition line information 184, information required for executing various processes in the present embodiment, programs, other various types of information, and the like. The image information 182 is information on a vicinity image of the host vehicle M (an image including at least the traveling direction of the host vehicle M) captured by the camera 10. Hereinafter, an image captured by the camera 10 is referred to as a "camera image." In the image information 182, the imaging time of the camera 10 and the position and direction of the host vehicle M during image capture may be associated with the camera image. The image information 182 stores a camera image before a predetermined time (before a predetermined image frame). The predetermined time in this case may be a fixed time, or may be a variable time according to the speed of host vehicle M or the shape of a road. Hereinafter, the camera image before a predetermined time is referred to as a "past camera image." The past camera image is an example of a "second image." The partition line information 184 is information on a road partition line (hereinafter simply referred to as a "partition line") for partitioning a lane on a road recognized by the recognizer 130 before a predetermined time. The partition line information 184 may include, for example, position information of a lane in which the host vehicle M travel (hereinafter referred to as a "host vehicle lane") obtained from the analysis result of the past camera image. In this case, the storage 180 holds partition lines for partitioning the host vehicle lane in the past camera image. The storage 180 may store map information (the first map information 54 or the second map information 62).

Figure 2:
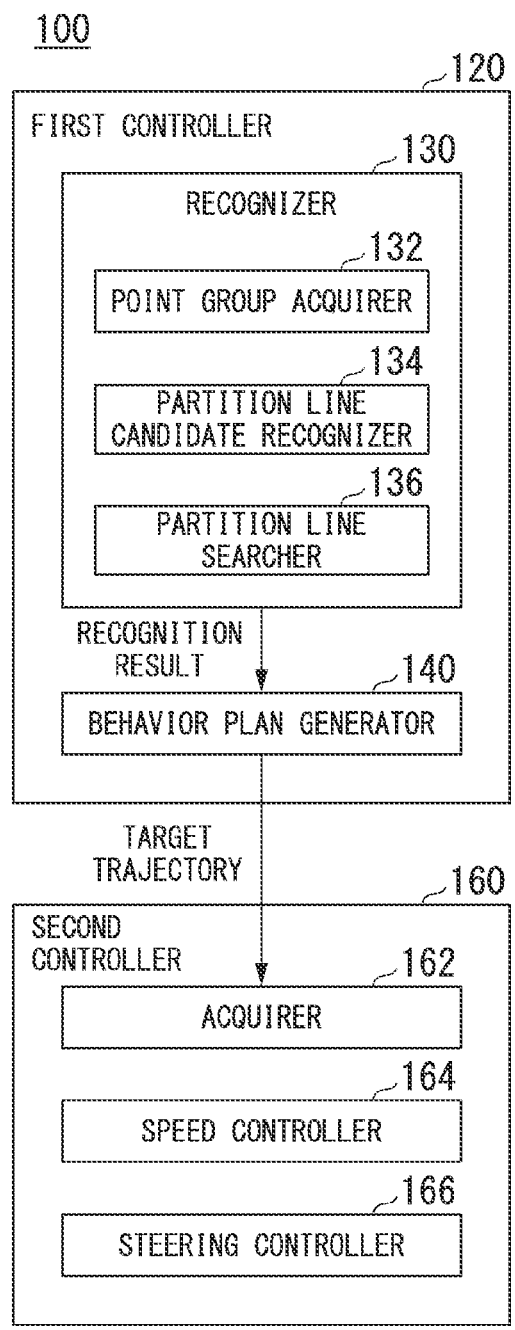
FIG. 2 is a functional configuration diagram of a first controller and a second controller.

FIG. 2 is a functional configuration diagram of the first controller 120 and the second controller 160. The first controller 120 includes, for example, the recognizer 130 and a behavior plan generator 140. The first controller 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal for which pattern matching is possible or a road sign) imparted in advance being concurrently executed, and performing comprehensive evaluation by performing scoring on both. Thereby, the reliability of automated driving is secured.

The recognizer 130 recognizes the positions (relative positions) of objects (for example, other vehicles or other obstacles) located in the vicinity of the host vehicle M and states such as speed (relative speed) and acceleration on the basis of the information which is input from the camera 10 and the radar device 12 through the object recognition device 16. The position of the object is recognized as, for example, a position in absolute coordinates (host vehicle center coordinate system) with a representative point (such as the centroid or the center of a drive shaft) of the host vehicle M as an origin, and is used in control. The position of the object may be represented by a representative point such as the centroid or a corner of the object, or may be represented by a region. In a case where the object is a mobile object such as another vehicle, the "state" of the object may include the acceleration or jerk of another vehicle, or a "behavior state" (for example, whether it is performing or attempting to perform a lane change).

The recognizer 130 recognizes, for example, the host vehicle lane on the basis of at least the information which is input from the camera 10. Specifically, the recognizer 130 includes, for example, a point group acquirer 132, a partition line candidate recognizer 134, and a partition line searcher 136, and recognizes partition lines for partitioning the host vehicle lane and the host vehicle lane itself using each function. The details of each function will be described later.

In addition to (or instead of) recognizing the host vehicle lane using the functions of the point group acquirer 132, the partition line candidate recognizer 134, and the partition line searcher 136, the recognizer 130 may recognize the partition lines for partitioning the host vehicle lane and the host vehicle lane itself by comparing a pattern of a partition line (for example, an array of solid lines and broken lines) obtained from the second map information 62 with a pattern of a partition line located in the vicinity of the host vehicle M which is recognized from an image captured by the camera 10. The recognizer 130 may recognize a runway boundary (road boundary) including a shoulder, a curbstone, a median strip, a guardrail, or the like without being limited to the recognition of a partition line. In this recognition, the position of the host vehicle M acquired from the navigation device 50 or processing results based on an INS may be added. The recognizer 130 recognizes a stop line, an obstacle, a red light, a tollbooth, a road mark, and other road events. The recognizer 130 may recognize an adjacent lane adjacent to the host vehicle lane and an opposite lane opposite to the host vehicle lane. The adjacent lane is, for example, a lane in which the vehicle can travel in the same direction as the traveling lane which is the host vehicle lane.

In a case where the host vehicle lane is recognized, the recognizer 130 may recognize the position and posture of the host vehicle M with respect to the host vehicle lane. The recognizer 130 may recognize, for example, deviation of the host vehicle M from the center of the lane which is a reference point, and an angle formed with respect to a line aligned with the center of the lane of the host vehicle M in its traveling direction, as the relative position and posture of the host vehicle M with respect to the host vehicle lane.

Instead, the recognizer 130 may recognize the position of the reference point of the host vehicle M or the like with respect to either lateral end portion (for example, a partition line or a road boundary) of the host vehicle lane, as the relative position of the host vehicle M with respect to the traveling lane. Here, the reference point of the host vehicle M may be the center of the host vehicle M or may be the centroid. The reference point may be an end portion (a front end portion or a rear end portion) of the host vehicle M, or may be a position at which one of a plurality of wheels of the host vehicle M is present.

The behavior plan generator 140 generates a target trajectory along which the host vehicle M will travel in the future automatically (irrespective of a driver's operation) on the basis of the recognition result or the like of the recognizer 130 so that the host vehicle M travels in the recommended lane determined by the recommended lane determiner 61 in principle and cap cope with the peripheral situation of the host vehicle. The target trajectory includes, for example, a speed element. For example, the target trajectory may be represented as a trajectory obtained by arranging points (trajectory points) at which the host vehicle M will arrive in order. The trajectory points are points at which the host vehicle M will arrive after predetermined traveling distances (for example, approximately every several [m]) which are distances along a road. Separately from the trajectory points, a target speed and a target acceleration for each predetermined sampling time (for example, approximately several tenths of a [sec]) are generated as a portion of the target trajectory. The trajectory points may be positions at which the host vehicle M will arrive at sampling times for respective predetermined sampling times. In this case, information of a target speed or target acceleration is represented by an interval between trajectory points. In a case where the set speed of the host vehicle M is determined in advance, the behavior plan generator 140 may generate a target trajectory such that the speed of the host vehicle M becomes the set speed within a range in which the vehicle can travel.

The behavior plan generator 140 may set automated driving events (functions) when generating a target trajectory. Examples of automated driving events include a constant-speed traveling event, a low-speed following traveling event, a lane change event, a divergence event, a merging event, a passing event, and the like. The behavior plan generator 140 generates a target trajectory according to a started event. In a case where driving control of the host vehicle M, a predetermined event, or the like is executed, the behavior plan generator 140 may propose (recommend) driving control and event execution to an occupant in accordance with the driving mode of the host vehicle M to be described later, and generate a target trajectory corresponding to a case where the proposal is approved.

The second controller 160 controls the traveling driving force output device 200, the brake device 210, and the steering device 220 so that the host vehicle M passes along the target trajectory generated by the behavior plan generator 140 according to scheduled times.

The second controller 160 includes, for example, an acquirer 162, a speed controller 164, and a steering controller 166. The acquirer 162 acquires information of target trajectory (trajectory point) generated by the behavior plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the host vehicle M and feedback control based on deviation from the target trajectory.

The HMI controller 170 notifies the occupant (driver) of the host vehicle M of predetermined information through the HMI 30. The predetermined information includes, for example, driving assistance information. For example, the HMI controller 170 may generate an image including the above-described predetermined information to display the generated image on a display device of the HMI 30, or may generate a sound indicating predetermined information to output the generated sound from a speaker of the HMI 30. The HMI controller 170 may output, for example, information accepted by the HMI 30 to the communication device 20, the navigation device 50, the first controller 120, and the like.

[Point Group Acquirer, Partition Line Candidate Recognizer, Partition Line Searcher]

Hereinafter, the details of the functions of the point group acquirer 132, the partition line candidate recognizer 134, and the partition line searcher 136 will be described.

The point group acquirer 132 acquires the current camera image (image indicating the situation ahead of the host vehicle M) from the camera 10, and acquires a point group of an object included in the acquired camera image. The current camera image is an example of a "first image." For example, the point group acquirer 132 extracts edge points from the camera image (first image) through the existing image analysis process, and collectively acquires points within a predetermined interval among the extracted edge points as a point group of the object. The point group acquired in this case is, for example, a point group which is defined in an image obtained by converting the camera image into a two-dimensional coordinate system (overhead coordinate system) in which the host vehicle M is viewed from above. The reference position (origin) of the two-dimensional coordinates in this case is, for example, a representative point of the host vehicle M. The point group acquirer 132 may store the camera image acquired from the camera 10 as the image information 182 of the storage 180.

Figure 3:
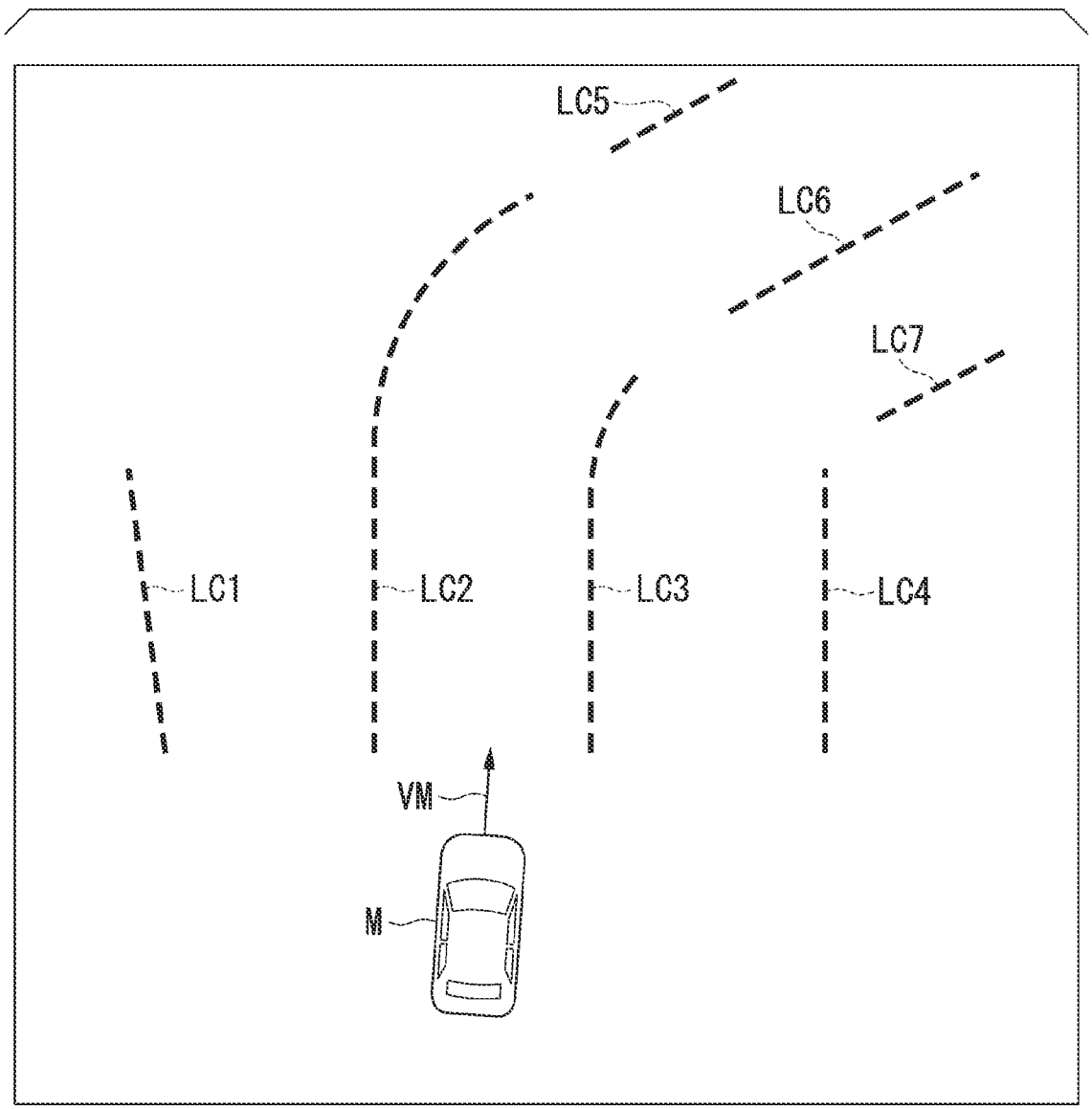
FIG. 3 is a diagram illustrating functions of a partition line candidate recognizer.

The partition line candidate recognizer 134 recognizes candidates for the partition lines for partitioning the host vehicle lane in which the host vehicle M travels from the point group acquired by the point group acquirer 132. FIG. 3 is a diagram illustrating functions of the partition line candidate recognizer 134. In the example of FIG. 3, the host vehicle M traveling in the direction of the arrow at a speed VM and partition line candidates recognized using a method to be described later are shown.

For example, the partition line candidate recognizer 134 forms a point sequence from point groups arranged at intervals within a predetermined distance in the same direction (including an allowable angle range) among the point groups acquired by the point group acquirer 132, and recognizes candidates for the partition line by comparing the formed point sequence with a point sequence pattern determined in advance. For example, in a case where a point sequence is linear and extends a predetermined distance or more or a case where it is non-linear but extends a predetermined distance or more with a predetermined curvature, the partition line candidate recognizer 134 recognizes the point sequence as a partition line candidate.

The partition line candidate recognizer 134 acquires candidates for the partition line at this point in time by inputting point group data acquired by the point group acquirer 132 into a trained model such as a deep neural network (DNN) that has learned to receive, for example, the point group data as an input and output candidates for the partition line corresponding to the point group data. The partition line candidate recognizer 134 may acquire candidates for the partition line at this point in time by inputting the camera image into a trained model such as a DNN that has learned to receive the camera image as an input and output candidates for the partition line corresponding to the image. In this case, the point group acquirer 132 may be omitted from the recognizer 130. The above-described trained model may be stored in the storage 180, or may be acquired from an external device using communication through the communication device 20. In the following description, partition line candidates LC1 to LC7 are assumed to be recognized by the partition line candidate recognizer 134 as shown in FIG. 3.

The partition line searcher 136 searches for (tracks) partition lines for partitioning the host vehicle lane among the partition line candidates LC1 to LC7 recognized by the partition line candidate recognizer 134. For example, the partition line searcher 136 acquires partition lines of the current traveling lane of the host vehicle M on the basis of the partition line candidates LC1 to LC7 and information indicating partition lines of the past traveling lane included in the past camera image (second image) included in the partition line information 184 of the storage 180. The partition line searcher 136 may acquire information indicating the partition lines of the past traveling lane by analyzing the past camera image stored in the storage 180 instead of acquiring it from the partition line information 184.

Figure 4:
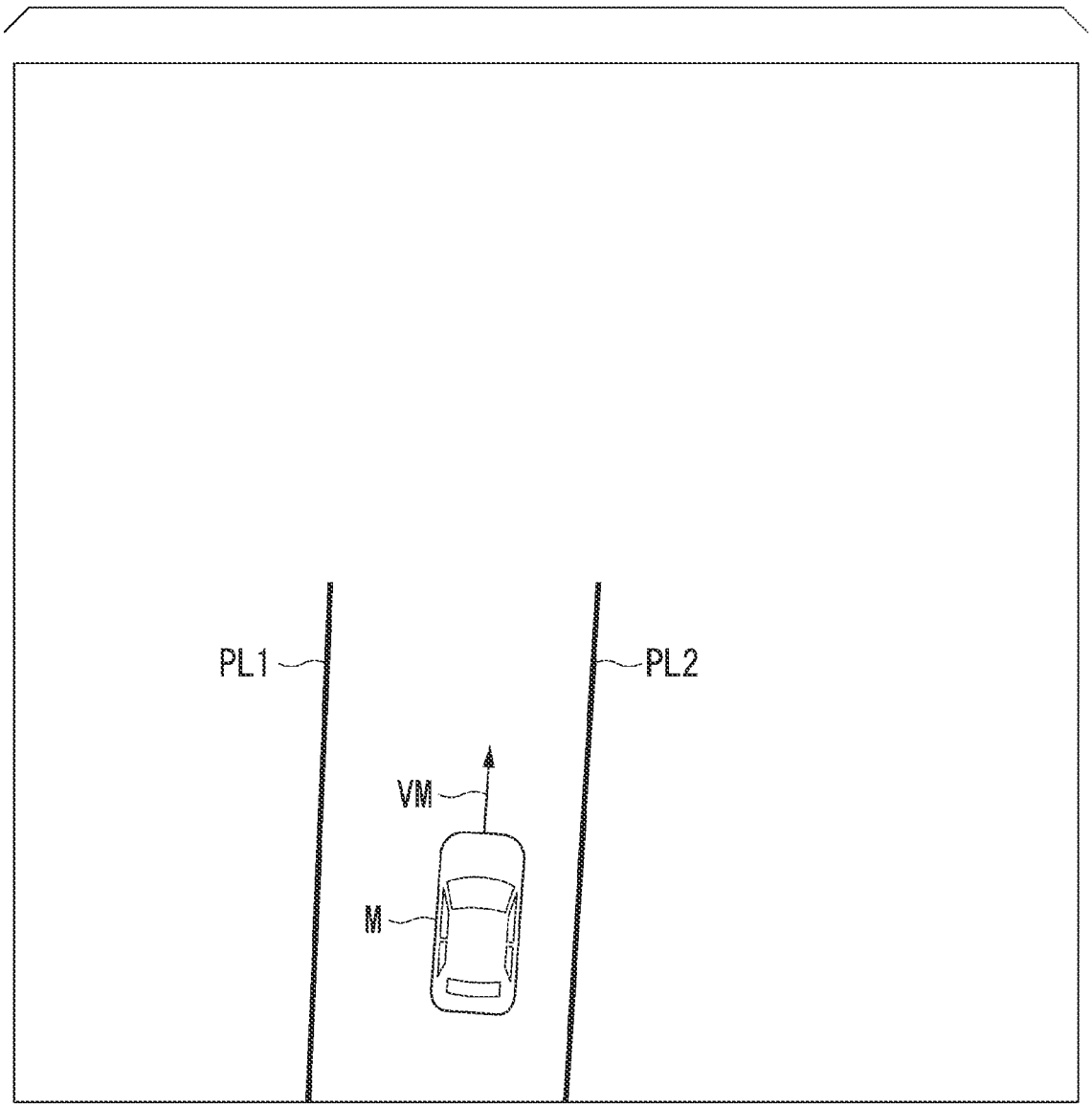
FIG. 4 is a diagram illustrating an example of past partition lines of a host vehicle lane.

FIG. 4 is a diagram illustrating an example of past partition lines of the host vehicle lane. In the example of FIG. 4, left and right partition lines PL1 and PL2 of the host vehicle lane which have been acquired as partition lines of the host vehicle lane by the partition line searcher 136 in the past and stored in the partition line information 184 of the storage 180 are shown. Hereinafter, the partition lines PL1 and PL2 are referred to as "the past partition lines PL1 and PL2." For example, the partition line searcher 136 replaces each of the past partition lines PL1 and PL2 with a coordinate system based on the position of the host vehicle M (host vehicle center coordinate system) in the two-dimensional coordinate system of the camera image at this point in time as shown in FIG. 3 on the basis of position information of the past partition lines PL1 and PL2.

Here, the position and direction of the host vehicle M when the past camera image was captured may be different from the current position and direction of the host vehicle M. Consequently, the partition line searcher 136 corrects the positions of the past partition lines PL1 and PL2 on the basis of one or both of the movement amount and movement direction of the host vehicle M from the time when the past camera image was captured to the present (more specifically, the camera image capturing time at which the partition line candidates LC1 to LC7 were recognized), or the shape of a road. For example, in a case where the host vehicle M has been making a turn from when the past camera image was captured, the partition line searcher 136 performs positioning so that the direction (movement direction) of the host vehicle is the same in the current camera image (first image) and the past camera image (second image), and corrects the positions of the past partition lines PL1 and PL2 corresponding to the direction. In a case where the inclination angle or curvature of a road has changed since the host vehicle M captured the past camera image, the positions of the past partition lines PL1 and PL2 are corrected in accordance with the inclination angle or curvature. This makes it possible to more accurately acquire a positional relationship between the past partition lines PL1 and PL2 and the partition line candidates LC1 to LC7.

Next, the partition line searcher 136 searches for a partition line candidate closest (nearest) to each of the past partition lines PL1 and PL2 among the partition line candidates LC1 to LC7 on the basis of the positional relationship between the past partition lines PL1 and PL2 and the partition line candidates LC1 to LC7, or the like. The term "closest" refers to, for example, the distance being closest. In addition to (or instead of) the distance, at least one of the inclination of the line based on the traveling direction of the host vehicle, the shape of the line in a predetermined section, the thickness of the line, the color of the line, the type of the line, and the like being closest may be included.

Figure 5:
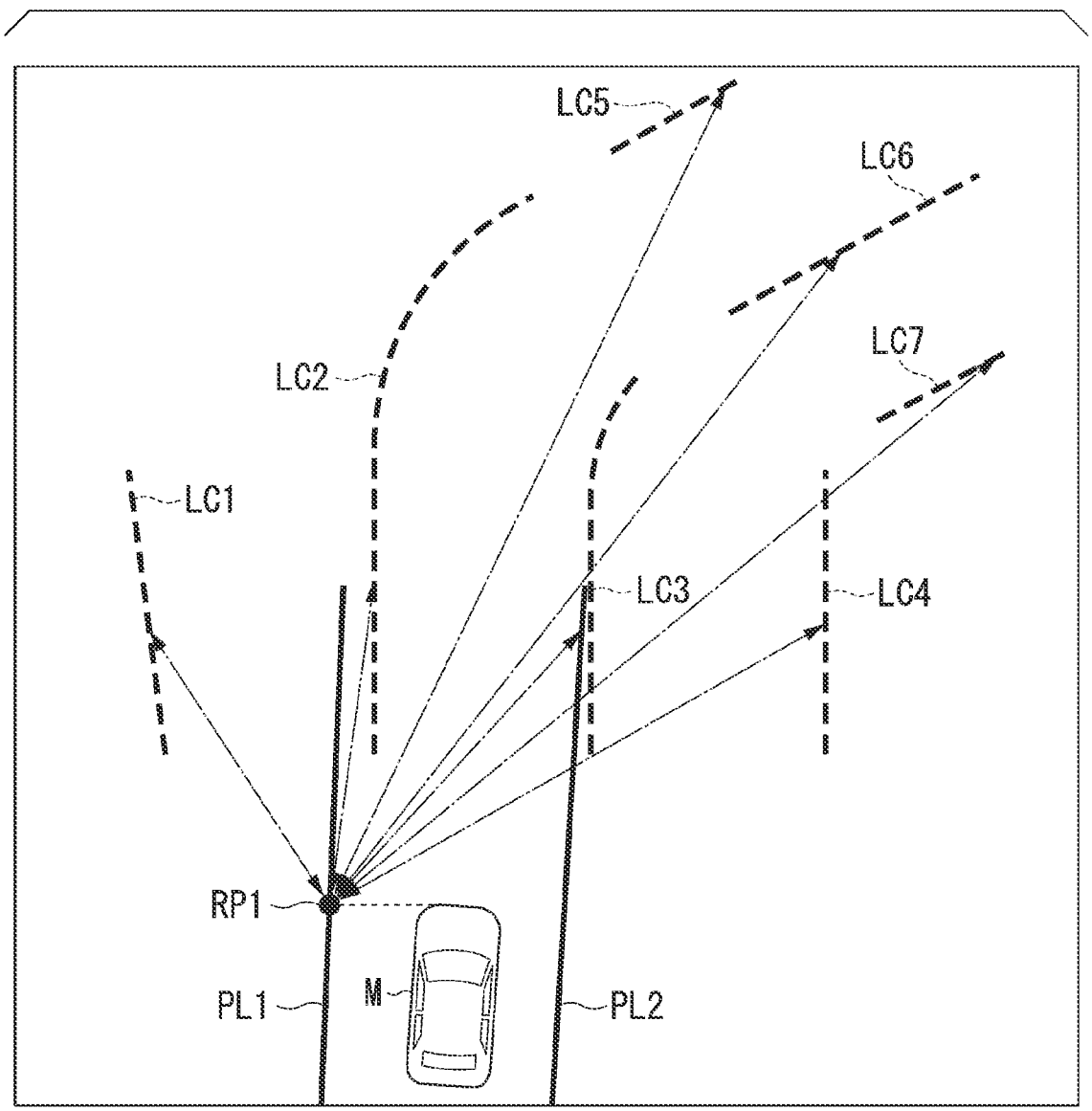
FIG. 5 is a diagram illustrating a comparison of the positions of a past partition line PL1 and partition line candidates LC1 to LC7.

FIG. 5 is a diagram illustrating a comparison of the positions of the past partition line PL1 and the partition line candidates LC1 to LC7. For example, as shown in FIG. 5, the partition line searcher 136 searches for a partition line candidate that exists at the closest distance from a reference position RP1 set on the past partition line PL1 among the partition line candidates LC1 to LC7. The reference position RP1 is set, for example, on the basis of the position of the host vehicle M. In the example of FIG. 5, the reference position RP1 is a point at which a line extending in a lateral direction (Y-axis direction) on the image from the tip portion of the host vehicle M touches the past partition line PL1, but a line extending in the lateral direction of the road from the tip portion may be used or another point may be used as a reference. Similarly, for the past partition line PL2, the partition line searcher 136 searches for a partition line candidate closest to the reference position which is set on the past partition line PL2 among the partition line candidates LC1 to LC7.

Figure 6:
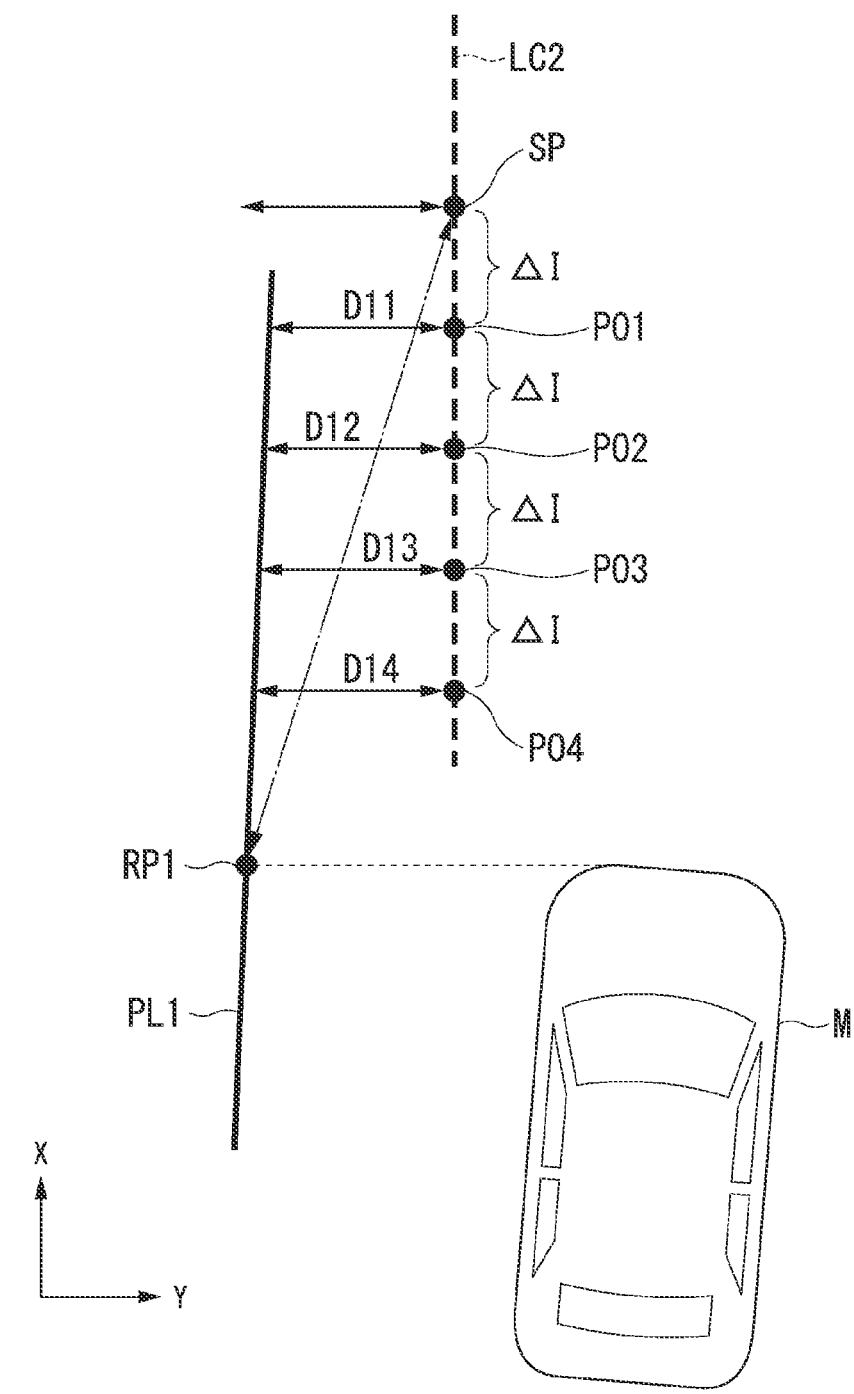
FIG. 6 is a diagram illustrating a method of deriving a distance between a past partition line and a partition line candidate.

FIG. 6 is a diagram illustrating a method of deriving a distance between the past partition line and a partition line candidate. A method of deriving a distance between the past partition line PL1 and the partition line candidate LC2 will be described below, but similar processing is performed on the derivation of distances between the past partition line PL1 and other partition line candidates LC1 and LC3 to LC7 and distances between the past partition line PL2 and the partition line candidates LC1 to LC7. In the example of FIG. 6, a section of the past partition line PL1 and the partition line candidate LC2 which is partially cut out is shown.

The partition line searcher 136 sets, for example, a search starting point SP on the partition line candidate LC2, and partially cuts out a section of each of the past partition line PL1 and the partition line candidate LC2 from the search starting point SP to the reference position RP1. The search starting point SP is, for example, a position which is determined on the basis of camera information (parameter information of the camera 10). The camera information includes, for example, the angle of view, an image capturable distance (limit distance), or the like. It is possible to suppress a recognition error and to perform more accurate line comparison, for example, by setting a search starting point within a range that does not exceed at least the image capturable distance on the basis of the camera information.

The partition line searcher 136 sets a predetermined number of points shifted from the search starting point SP for each predetermined interval ΔI in a direction in which the reference position RP1 exists on the partition line candidate LC2, and derives each distance from each of the set points to a point where a line extending in the lateral direction (Y-axis direction) of the image (or a line extending in a direction perpendicular to the extension direction of the partition line candidate LC2) touches the past partition line PL1. The predetermined interval ΔI may be, for example, a fixed interval determined in advance, or may be a variable interval based on the speed of the host vehicle M detected by the vehicle sensor 40, the shape of a road, or the like. The predetermined number may be, for example, a fixed number determined in advance, or may be a variable number based on the speed of the host vehicle M, the shape of a road, or the like. In the example of FIG. 6, four search points PO1 to PO4 are set. The partition line searcher 136 derives a distance at each point on the basis of the difference from the past partition line PL1 in the direction of the lateral position of the image from the search starting point SP and each of the search points PO1 to PO4. In the example of FIG. 6, since there is no past partition line PL1 in the lateral direction of the search starting point SP, the distance from this point is not derived, and distances D11 to D14 corresponding to the search points PO1 to PO4 are derived. The partition line searcher 136 then derives a distance between the past partition line PL1 and the partition line candidate LC2 on the basis of each of the distances D11 to D14. The distance is derived, for example, by obtaining the square mean value of each of the distances D11 to D14. The distance may be derived by substituting the values of the distances D11 to D14 into the added value or average value of the distances D11 to D14 or a predetermined function. The distance may be a distance on the image converted into a diagram of the host vehicle M viewed from above (host vehicle center coordinate system image), or may be an actual distance adjusted on the basis of imaging information of the camera image.

The partition line searcher 136 derives the distances similarly for other partition line candidates LC1 and LC3 to LC7, extracts a partition line candidate closest to the past partition line PL1, and determines the extracted partition line candidate as a section line for partitioning the current host vehicle lane (more specifically, a left partition line for partitioning the host vehicle lane). In addition, similarly, the partition line searcher 136 derives a distance between the past partition line PL2 and each of the partition line candidates LC1 to LC7, and determines a partition line candidate closest to the past partition line PL2 among the partition line candidates LC1 to LC7 as a partition line for partitioning the current host vehicle lane (more specifically, a right partition line for partitioning the host vehicle lane). In a case where any one of the past partition lines PL1 and PL2 cannot be searched from the partition line candidates LC1 to LC7, the partition line searcher 136 may output only position information of the other searched partition line. This makes it possible to cause the host vehicle M to travel on the basis of the information on one partition line obtained as the search result.

In the above-described example, the partition line searcher 136 sets each point for deriving a distance at a predetermined interval from the search starting point SP toward the reference position RP1 side (in other words, the front side of the host vehicle M), but may set a predetermined number of points at predetermined intervals ΔI on the past partition line toward the search starting point SP with the reference position of the past partition line as a starting point. The partition line searcher 136 may set the predetermined interval ΔI so that a predetermined number of points can be extracted from the search starting point SP.

In a case where two partition line candidates continuously extending in the traveling direction are close to each other, the partition line searcher 136 may interpolate and connect a line between the two partition line candidates. In a case where there is no past partition line in the lateral direction of the partition line candidate or a case where the length of the past partition line is short, the partition line searcher 136 may extend the partition line candidate or the past partition line in the extension direction so that distances based on a predetermined number of search points can be derived. By setting a predetermined number of search points, it is possible to more accurately derive closeness between lines including the shape in a predetermined section instead of the distance of only one point.

For example, on the basis of the positional relationship between the partition line candidates, the partition line searcher 136 may exclude a partition line candidate of which the distance from the past partition line is greater than that of other partition line candidates from targets for derivation of distance. For example, in the case of FIG. 5, since the partition line candidates LC5 to LC7 are located at positions farther from the past partition line RP1 (a predetermined distance or more) than LC1 to LC4, these candidates are excluded from the targets for derivation of distance from the past partition line RP1. This makes it possible to reduce the number of partition line candidates to be searched and to improve the efficiency of processing.

In a case where the distance (closeness) between the past partition line and the closest partition line candidate is equal to or greater than a threshold (not less than a threshold), the partition line searcher 136 may determine that there is no partition line equivalent to the past partition line among the partition line candidates LC1 to LC7. In this case, the partition line searcher 136 continues to use partition lines of the past host vehicle lane searched in the past as the partition lines for partitioning the current host vehicle lane. Thereby, even in a case where the partition line candidate cannot be temporarily recognized from the camera image due to the surrounding environment of the host vehicle M or the state of the partition line drawn on the road surface, driving assistance such as LKAS can be continued on the basis of the position of the partition line of the traveling lane which is the past (for example, immediately preceding) search result.

The partition line searcher 136 stores information relating to the partition lines of the host vehicle lane obtained by the current search (such as, for example, position information of the partition line based on the position of the host vehicle M) and information on the host vehicle lane itself partitioned by the partition line in the partition line information 184 of the storage 180, and uses the information when searching for the partition lines for partitioning the host vehicle lane next time.

The recognizer 130 outputs a recognition result including the partition line information of the host vehicle lane determined by the partition line searcher 136 to the behavior plan generator 140. The behavior plan generator 140 generates a target trajectory of the host vehicle M so that the host vehicle M travels toward a destination or the like set by the navigation device 50 on the basis of the recognition result, and executes driving control so that the host vehicle M travels along the generated target trajectory.

[Process Flow]

Figure 7:
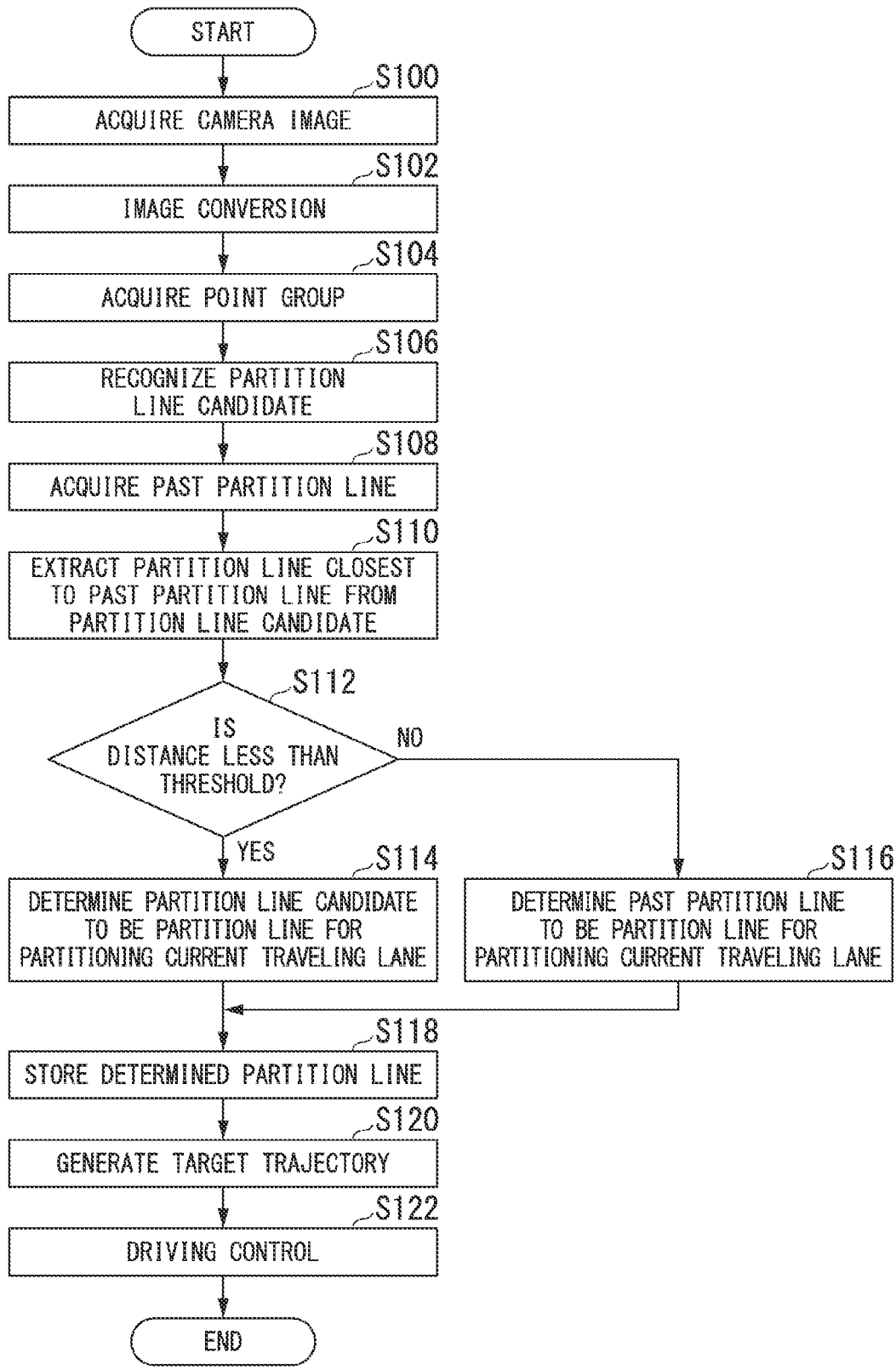
FIG. 7 is a flowchart illustrating an example of a flow of processes which are executed by an automated driving control device of the embodiment.

FIG. 7 is a flowchart illustrating an example of a flow of processes which are executed by the automated driving control device 100 of the embodiment. Hereinafter, description will be focus on a process of mainly searching for partition lines for partitioning the traveling lane of the host vehicle M and executing driving control of the host vehicle M on the basis of information on the partition line or the like obtained as a search result among the processes which are executed by the automated driving control device 100. The processing of FIG. 7 may be repeatedly executed at predetermined intervals while automated driving control for the host vehicle M is being executed.

In the example of FIG. 7, the point group acquirer 132 acquires a camera image representing the situation ahead of the host vehicle M captured by the camera 10 (step S100). Next, the point group acquirer 132 converts the acquired image into an image coordinate system in which the host vehicle M is viewed from above (step S102), and acquires a point group of an object included in the converted camera image (step S104). Next, the partition line candidate recognizer 134 recognizes partition line candidates from the point group of the object (step S106).

Next, the partition line searcher 136 acquires information indicating the partition lines for partitioning the past host vehicle lane of the host vehicle M from the partition line information 184 stored in the storage 180 (step S108). In the process of step S108, the partition line searcher 136 may perform correction for converting the acquired position of the past partition line into a host vehicle center coordinate system based on the current position of the host vehicle M. Next, the partition line searcher 136 extracts a partition line closest to the past partition line from the partition line candidates (step S110). Next, the partition line searcher 136 determines whether a distance between the extracted closest partition line candidate and the past partition line is less than a threshold (step S112). In a case where it is determined that the distance is less than the threshold, the partition line searcher 136 determines the partition line candidate to be the partition line for partitioning the current host vehicle lane of the host vehicle M (step S114). In the process of step S112, in a case where it is determined that the distance is not less than the threshold (equal to or greater than the threshold), the partition line searcher 136 determines the past partition line (for example, the previously searched partition line) stored in the storage 180 to be the partition line for partitioning the current host vehicle lane (step S116). After the processes of steps 116 and S118, information indicating the determined partition lines of the host vehicle lane is stored in the storage 180 as the partition line information 184 (step S118).

Next, the behavior plan generator 140 generates a target trajectory for the host vehicle M to travel in the center of the host vehicle lane partitioned by the determined partition lines (step S120). Next, the second controller 160 executes driving control for controlling one or both of the steering or speed of the host vehicle M so that the host vehicle M travels along the generated target trajectory (step S122). This concludes the processing of the present flowchart.

Modification Example

The vehicle system 1 described above may be provided with a light detection and ranging (LIDAR). The LIDAR irradiates the periphery of the host vehicle M with light (or electromagnetic waves having a wavelength close to light), and measures scattered light. The LIDAR detects a distance to an object on the basis of a time from light emission to light reception. The irradiation light is, for example, pulsed laser light. The LIDAR is installed at any point on the host vehicle M. For example, the object recognition device 16 may accept an input from the LIDAR in addition to the camera 10 and the radar device 12, and recognize a nearby object (including a partition line) from the result of a sensor fusion process based on information input from each.

In the above-described embodiment, in a case where a destination is not set by the navigation device 50 and the host vehicle M is traveling through a driver's operation, the above-described partition line searcher 136 may use the information on the searched partition lines of the host vehicle lane to perform driving control for assisting a portion of the steering and speed of the host vehicle M.

In the case of searching for a partition line candidate closest to the past partition line from the partition line candidates, the partition line searcher 136 may, for example, use an existing matching algorithm to derive a partition line candidate which is closest (for example, having a highest matching degree).

In the case of searching for a line closest to the past partition line from the partition line candidates, the partition line searcher 136 may, for example, use an existing matching algorithm to derive a line closest to the past partition line (for example, having a highest matching degree). Information relating to the past partition line (the previous searched partition line) used by the partition line searcher 136 during searching may be acquired from the image stored in the image information 182 instead of the partition line information 184.

According to the above-described embodiment, in the automated driving control device (an example of a mobile object control device), it is possible to more accurately recognize partition lines for partitioning a host vehicle lane by including the partition line candidate recognizer 134 that recognizes candidates for partition lines for partitioning a traveling lane in which a host vehicle (an example of a mobile object) travels from a first image including the vicinity of the mobile object captured by the camera (an example of an image capturer) 10, and the partition line searcher 136 that selects a partition line candidate closest to a past partition line for partitioning the traveling lane of the host vehicle M before a predetermined time, among the partition line candidates recognized by the partition line candidate recognizer 134, as a partition line for partitioning a current traveling lane of the host vehicle M.

Specifically, according to the above-described embodiment, it is possible to drive while always ascertaining the host vehicle lane by sequentially searching for a partition line candidate closest to the host vehicle lane recognized in the past among the partition line candidates recognized from the camera image. According to the embodiment, the current partition line is searched in consideration of not only the past partition line information but also the movement amount and movement direction of the host vehicle M, the shape of a road, or the like, and thus it is possible to prevent the partition lines of the host vehicle lane from being lost, and to track the host vehicle lane even in a case where the host vehicle M deviates from the traveling lane. According to the embodiment, it is possible to continue traveling using the past information even in a case where the partition line cannot be temporarily recognized.

The above-described embodiment can be represented as follows.

A mobile object control device including:
a storage device having a program stored therein; and
a hardware processor,
wherein the hardware processor executes the program stored in the storage device, to thereby recognize candidates for partition lines for partitioning a traveling lane in which a mobile object travels from a first image including the vicinity of the mobile object captured by an image capturer; and select a partition line candidate closest to a past partition line for partitioning the traveling lane of the mobile object before a predetermined time, among the recognized partition line candidates, as a partition line for partitioning a current traveling lane of the mobile object.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A mobile object control device comprising:
a processor that executes instructions to:
  recognize multiple candidates for partition lines for partitioning a traveling lane in which a mobile object travels from a first image including the vicinity of the mobile object captured by an image capturer; and
  select a partition line candidate closest to a past partition line for partitioning the traveling lane of the mobile object before a predetermined time, among the partition line candidates recognized, as a partition line for partitioning a current traveling lane of the mobile object,
wherein the processor
  sets a search starting point on the lane line candidates,
  sets a reference position on the past partition line,
  sets search points on the lane line candidates at predetermined intervals in a direction from the search starting point to the reference position,
  derives a distance between the past partition line and the lane line candidates by deriving the distance from the search point to the past partition line for each of the multiple lane line candidates and the past partition line, and
  recognizes the lane line candidate closest to the past partition line among the multiple lane line candidates as the driving lane in which the mobile object is traveling.

2. The mobile object control device according to claim 1, wherein the past partition line is extracted from a second image including the vicinity of the mobile object captured by the image capturer before the predetermined time.

3. The mobile object control device according to claim 1, wherein the processor detects closeness between the partition line candidate and the past partition line in a section obtained by partially cutting out the partition line candidates recognized and the past partition line on the basis of a reference position.

4. The mobile object control device according to claim 1, wherein the processor converts the first image and a second image including the vicinity of the mobile object captured by the image capturer before the predetermined time into an image of the mobile object viewed from above, and determines a partition line closest to the past partition line on the basis of a square mean value of a difference in lateral position between each of the partition line candidates included in the converted image and the past partition line.

5. The mobile object control device according to claim 1, wherein the search starting point is set on the basis of parameter information of the image capturer.

6. The mobile object control device according to claim 1, wherein the processor corrects a position of the past partition line on the basis of one or both of a movement amount and movement direction of the mobile object before the predetermined time or a shape of a road.

7. The mobile object control device according to claim 1, wherein, in a case where closeness of a partition line candidate closest to the past partition line for partitioning the traveling lane of the mobile object before a predetermined time among the partition line candidates recognized is equal to or greater than a threshold, the processor selects partition lines for partitioning a past traveling lane of the mobile object searched in the past as partition lines of the current traveling lane.

8. The mobile object control device according to claim 1, wherein the processor further executes instructions to:
  control one or both of a speed or steering of the mobile object so that the mobile object travels along the partition lines for partitioning the traveling lane of the mobile object determined.

9. A mobile object control method comprising causing a computer of a mobile object control device to:
  recognize candidates for partition lines for partitioning a traveling lane in which a mobile object travels from a first image including the vicinity of the mobile object captured by an image capturer;
  select a partition line candidate closest to a past partition line for partitioning the traveling lane of the mobile object before a predetermined time, among the recognized partition line candidates, as a partition line for partitioning a current traveling lane of the mobile object;
  set a search starting point on the lane line candidates;
  set a reference position on the past partition line;
  set search points on the lane line candidates at predetermined intervals in a direction from the search starting point to the reference position;
  derive a distance between the past partition line and the lane line candidates by deriving the distance from the search point to the past partition line for each of the multiple lane line candidates and the past partition line; and
  recognize the lane line candidate closest to the past partition line among the multiple lane line candidates as the driving lane in which the mobile object is traveling.

10. A computer readable non-transitory storage medium having a program stored therein, the program causing a computer of a mobile object control device to:
  recognize candidates for partition lines for partitioning a traveling lane in which a mobile object travels from a first image including the vicinity of the mobile object captured by an image capturer;
  select a partition line candidate closest to a past partition line for partitioning the traveling lane of the mobile object before a predetermined time, among the recognized partition line candidates, as a partition line for partitioning a current traveling lane of the mobile object;
  set a search starting point on the lane line candidates;
  set a reference position on the past partition line;
  set search points on the lane line candidates at predetermined intervals in a direction from the search starting point to the reference position;

derive a distance between the past partition line and the lane line candidates by deriving the distance from the search point to the past partition line for each of the multiple lane line candidates and the past partition line; and recognize the lane line candidate closest to the past partition line among the multiple lane line candidates as the driving lane in which the mobile object is traveling.

* * * * *